3,362,385
FEED OF ROTARY PISTON ENGINE
Jean-Pierre Soubis, La Celle-Saint-Cloud, "Les Geais,"
Domaine Saint-Francois d'Assise, Seine-et-Oise, France
Filed Dec. 13, 1965, Ser. No. 513,463
Claims priority, application France, Dec. 14, 1964,
998,547
12 Claims. (Cl. 123—8)

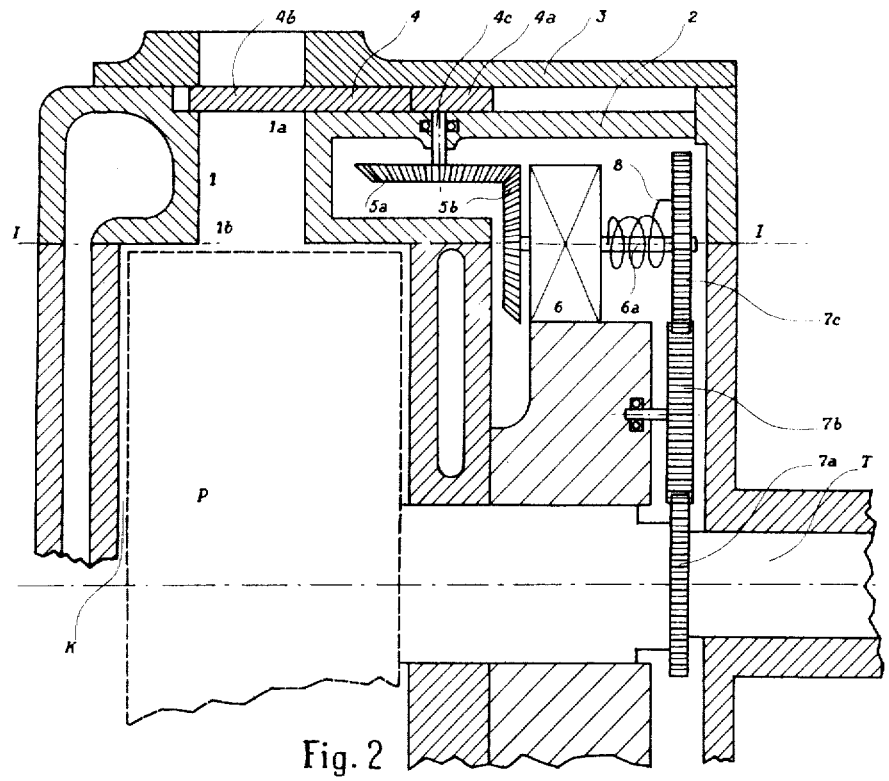
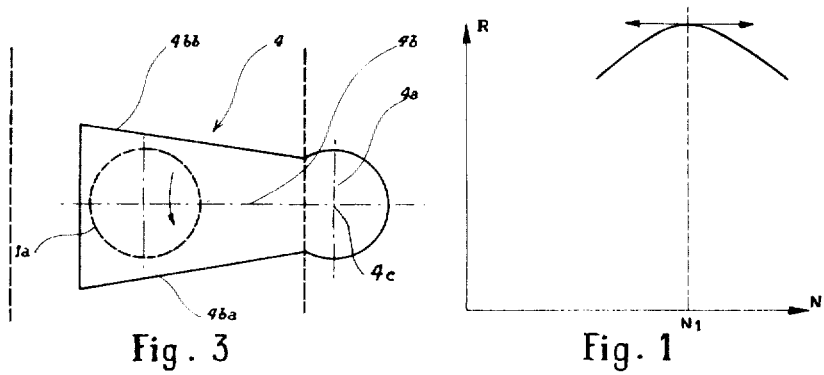
Fig. 2
Fig. 3
Fig. 1

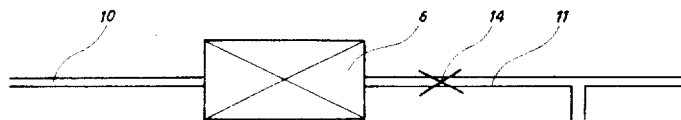
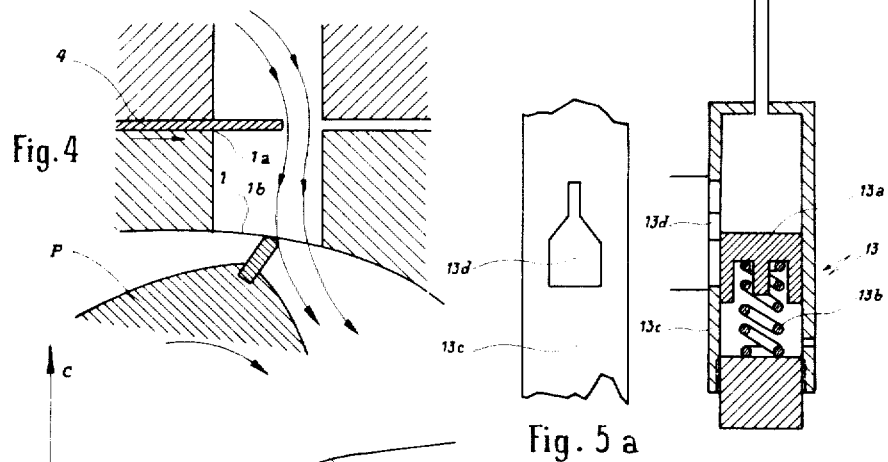
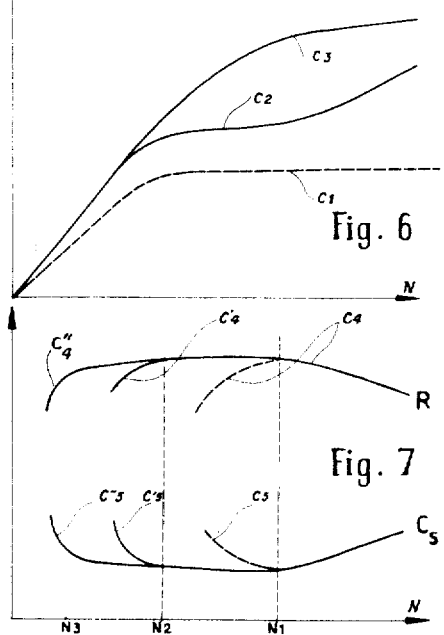
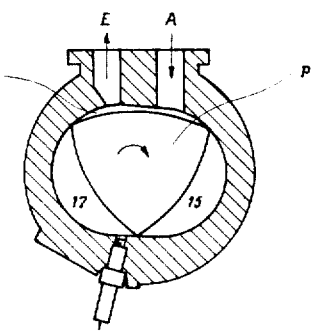

It is known that the feed of rotary piston engines has particular problems relating to the coefficient of charge or to the charge that can be obtained at different engine speeds. Generally speaking, the coefficient of charge cannot be maintained sufficiently constant for all engine speeds and principally at low speeds. It will be remembered that the coefficient of charge is the ratio between the volume of gas drawn into each chamber at atmospheric pressure and at ambient temperature to the maximum volume of the chamber. Whether a diesel engine is considered or an engine having a carburetor or injector, the gas drawn in is pure air or carbureted air.

Rotary piston engines can be arranged in such a way as to utilize the dynamic effects of vibration of the column of gas in the admission duct to obtain a coefficient of charge which is very high, in excess of 100%, for a given speed. To obtain this result, the feed circuit is given characteristics of length and cross-section such that the gases therein in vibratoring state create at the chosen speed a high pressure at the intake port at the moment of closure of the intake port. A super-charge results in the combustion chamber under the effect of resonance at the selected speed. This provides a very high charge at a chosen speed $N_1$ in the case of an engine having a carburetor; correct carburetion; and proper fuel consumption at this speed.

FIG. 1 shows graphically the result obtained, in the form of the variations of charge R or engine power as a function of engine speed N (speed of the crank shaft) when a venturi of relatively large diameter is used in the carburetor. Unfortunately, for such an arrangement, at a lower speed $N_1$, the relationship between the movement of the gaseous column and the closing of admission is no longer obtained and admission closes on a reduced pressure in the chamber. A large loss of charge results. For an engine having a carburetor, the movement of the gaseous column remains very pulsating, the low pressure in the venturi of the carburetor and the amount of fuel drawn in remain large resulting in extra richness and high consumption of fuel. The movement of the gaseous column toward the exterior of the chamber corresponds to poor vaporization of fuel by the carburetor.

To overcome these inconveniences, for engines with carburetors, a very small venturi in the carburetor can be used for a low speed $N_1$ removing all possibility of dynamic super-charging which is equivalent to sacrificing an advantage to eliminate an inconvenience. In rotary piston motors, as in conventional motors, delay in the closing of admission is necessary only as a compromise between the high and low speeds. This delay, which remains fixed when the speed varies, leads to a flow of air toward the exterior of the chamber at low speed independently of the dynamic effects with the already mentioned inconveniences.

It is the object of the present invention to correct the insufficiencies discussed above in the prior art.

More specifically, the present invention relates to a process for control of the feed of air, carbureted or not, in rotary piston engines, using an admission circuit having characteristics selected for obtaining an optimum level of charge for a certain speed of the engine by utilizing the dynamic effects of the feed gas in vibrating state. This process has for further object to retain an elevated level of charge at lower speeds than the speed for which the charge is optimum and consists essentially, for a given lower speed, to advance by a same interval in the cycle the closing and opening of admission, the larger, the more the speed of the motor drops below the speed of optimum charge.

At partial charges it will be advantageous to reduce the advance of opening of admission in accordance with the above process at speeds lower than the speed for which the charge is optimum in such a way as to reduce the interval of time during which exhaust and admission are simultaneously open.

Penetration of exhaust gas into the intake port at low charges will thus be avoided when the admission pressure is much lower than the exhaust pressure.

The present invention also relates to apparatus for carrying out the above process. This apparatus comprises an admission circuit having characteristics suitable for obtaining an optimum level of charge for a certain motor speed by utilization of the dynamic effects of the feed gas in vibrating state. This arrangement provides a high level of charge at lower speeds than the speed of optimum charge. This apparatus includes a rotating obturator cooperating with the inlet port of the engine. This obturator is mounted on a shaft coupled to the drive shaft of the engine by intermediate means providing an adjustment for the displacement in the angular position of the obturator shaft with respect to the drive shaft of the engine at a given instant, this angular difference being maximum at the speed of optimum charge and decreasing as the engine speed decreases from such maximum speed.

This adjustment means can include a transmission shaft cooperating with apparatus exerting on the shaft a resistance force in function of engine speed. This transmission shaft is associated with the drive shaft of the engine and the shaft of the obturator respectively by coupling means including an elastic transmission system.

Means may also be employed to exert on the transmission shaft a corrective force in function of the load.

The elastic transmission system may include a gear which is mounted for free rotation on the transmission shaft and a torsion spring having one of its ends fixed to the gear and the other end fixed to the transmission shaft.

This torsion spring may be replaced by a torsion bar or any other equivalent structure.

The rotation of the gear on the transmission shaft may be limited by means of stops.

The apparatus exerting a resistance force on the transmission shaft may be a pump having a shaft driven by the transmission shaft.

A calibrated jet may be placed in the supply circuit of the pump to modify the resistance torque.

To the same end, the pump may be connected to a discharge system including a cylinder in which a sliding piston is mounted in front of a discharge port let in the lateral wall of the cylinder, the piston being biased by a compression spring.

Other means may be provided for varying the loss of charge in the intake circuit of the pump as a function of the load of the engine.

Various embodiments of the present concept are illustrated in the accompanying drawings and will be described hereinafter to illustrate the present invention. These embodiments should in no way be construed as limiting the scope of the present concept.

In the accompanying drawings, in which like reference characters indicate like parts, FIG. 1 graphically illustrates the variations of charge R as a function of motor speed N;

FIG. 2 is a schematic partial section of a rotary motor including an obturator for control of admission in accordance with a preferred embodiment of the present invention, this view being taken in part on a plane parallel to the axis of the drive shaft of the engine and passing through the axis of the admission duct and in a plane passing through the principal axis of the motor, these two planes intersecting at line 1—1;

FIG. 3 is a view from above of the position of the obturator in front of the admission port of the engine;

FIG. 4 is a partial schematic view in section of an engine modified in accordance with the present invention adjacent the level of the admission duct and perpendicular to the axis of the motor shaft;

FIG. 5 shows schematically a suitable means for controlling the angular displacement of the obturator including a hydraulic pump;

FIG. 5a is a partial view from the left of the apparatus of FIG. 5;

Figures 9, 10:
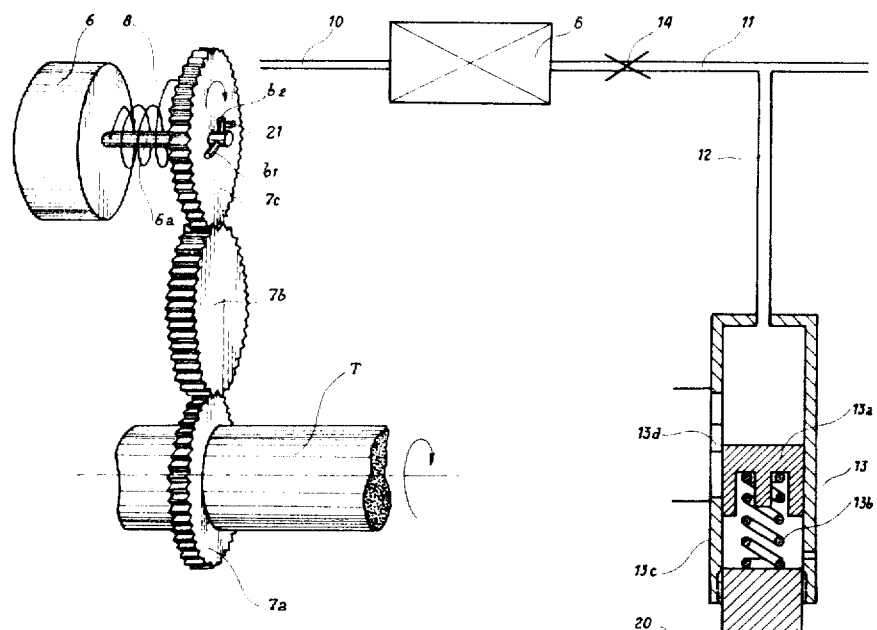

FIG. 6 graphically represents the several curves of the resistance torque of the pump of FIG. 5;

FIG. 7 graphically represents the improvements in the feed curves and consumption curves obtained at low speeds by the present invention;

FIG. 8 is a schematic showing of an embodiment of the present invention applied to a rotary motor;

FIG. 9 schematically represents means for obtaining angular displacement of the obturator as a function of the load of the engine; and FIG. 10 shows structure for limiting the angular displacement of the obturator of FIG. 3.

Referring to FIG. 2, a rotary piston motor is schematically shown including piston P movable in chamber K and transmitting its movement to a central motor shaft T in known manner. Admission duct 1 enters chamber K at admission port 1b. Obturator 4 is mounted above admission port 1b between walls 2 and 3 comprising, as shown, a circular portion 4a and an arm 4b (FIG. 3). Obturator 4 rotates on axis 4c in the direction shown by the arrow in FIG. 3 and periodically obturates ducts 1 at 1a. Rotation of obturator 4 is provided by shaft T of the motor through two gears 5a and 5b and a transmission shaft 6a. A resistance force is exerted on shaft 6a in a function of the engine speed. In this embodiment, shaft 6a is a pump shaft which may be, but not necessarily, the oil pump of the engine. Between shaft T and shaft 6a of the pump is a system of gears 7a, 7b, 7c and a spring 8 is mounted around shaft 6a on which gear 7c is mounted for free rotation. Spring 8 transmits the movement of gear 7c to shaft 6a with a certain angular displacement depending upon the force of the torsion of spring 8 which is instantaneously equal to the resistance force of pump 6. Thus shaft T entrains obturator 4 in rotation but with an instantaneous angular lag which depends on the resistance force of pump 6.

From the point of view of speed of rotation, obturator 4 with a single arm 4b, when the engine speed is constant, rotates at the speed of rotation of shaft T. It should be understood that spring 8 as a means of transmission of angular displacement between gear 7c and shaft 6a can be replaced by other equivalent means such as a torsion bar.

The exhaust port is not shown in FIG. 2. Control of the opening and closing of the exhaust port is obtained in known manner.

Distribution of the carbureted air or plain air to the engine is thus made variable by obturator 4, the arm 4b of which rotates and masks and unmasks admission port 1a. Obturator 4 is preferably made of a self-lubricating material such as "Teflon" and is preferably thin. Contact of the obturator against walls 2 and 3 is lubricated by oil which is injected in the admission port or mixed with the fuel. The rubbing surface is reduced at arm 4b and centrifugal force does not force this arm against the faces of the walls between which it is mounted. It follows that the loss of strength by friction is negligible. The arm being thin and flexible it is instantaneously applied on one of the faces between which it is mounted when it is subjected to a pressure or to a vacuum exerted by the fresh gas circulating in the admission duct 1 thus providing a good seal.

These pressures or vacuums are rather weak. The edges 4ba and 4bb of the arm effect, respectively, the closing and opening of admission and have profiles nearly parallel to the triangular edges of piston P which normally open and close admission.

Further, admission ports 1a and 1b are located, respectively, at the level of the obturator and at the entry into chamber K and are quite close to each other. It follows that at speeds or loads where the sealing arm follows, for example, the same law of closing as the edge of piston P at 1b flow occurs subtantially as illustrated in FIG. 4.

The length of tube 1 between 1a and 1b is sufficiently short (FIG. 4) so that the body of gas remains substantially the same in cross-section between the two ports instead of enlarging so as to occupy the total section of tube 1.

The body of air thus retains an almost constant form between 1a and 1b.

Pump 6, if it is the oil pump of the engine which it need not be, should provide a total discharge greatly in excess of the strict requirements of the engine and have as high a speed of rotation as possible so as to have good flow characteristics and a resistance force practically independent of the state of wear of the engine. The pump can be a gear pump with a large by-pass flow in comparison with the flow which circulates in the motor (FIG. 5) and is rotated by the drive shaft of the motor.

The respective times of closing and opening of intake port 1a by obturator 4 will be fixed for a given speed and will be advanced in identical manner as the speed decreases since the angular displacement between shaft T of the motor and shaft 6a decreases appreciably with the resistance force C of pump 6 (balanced by the torsion force of spring 8) which is a function of the speed.

The resistance force C of the pump can be varied and with it the angular offset between shaft 4a of the obturator and shaft T of the motor as a function of speed of the motor in accordance with a predetermined law. Various systems can be utilized for this purpose in combination with the pump circuit which includes a pump circuit 10, a delivery circuit 11, and a by-pass circuit 12 with a discharge system 13 in the by-pass. A pump with a large volume in the by-pass should be used.

The curve of the resistance C of the pump as a function of the motor speed N will then be of the type C1 of FIG. 6.

A calibrated jet can be interposed at 14 in the delivery circuit 11 upstream of the by-pass which creates a change of pressure in the pressure of the supply and thus the resistance force which is independent of the state of wear of the motor since the jet is not subjected to wear and is independent of the viscosity of the fluid of the pump since the loss of charge in the jet only acts on the velocity. This change of pressure varies rapidly in function of the speed thus, if needed, providing an increase in function of speed which is more rapid than would be normal in accordance with curve C1. This change is independent of variations in the motor since the jet is calibrated with precision and the curve of the pump which results is of a type C2 of FIG. 6.

A discharge system 13 can be used including a piston 13a, biased by a spring 13b, sliding in a cylinder 13c provided with a discharge port 13d. The shape of port 13d is of variable size as seen in elevation in FIG. 5a.

The pump curve thus obtained is of the type C3 in FIG. 6 and has more than two slopes.

It should be understood that the pump by-pass and the calibrated jet can be used together.

Generally speaking, because of the instantaneous equality of the resistance force of pump 6 and the torsion of spring 8, it is possible to vary the angular displacement of obturator 4 with respect to speed in accordance with curves C1, C2, C3.

It is thus possible in accordance with the present invention to give the obturator a predetermined variable angular lag to overcome the insufficiencies of the engine at low speed.

It is also possible to obtain displacement in rotation of obturator 4 as a function of the load of the engine utilizing a parameter connected therewith such as the opening of the throttle valve for an engine having a carburetor or the depression downstream of said a valve to modify the characteristics of the resistance force of the pump when the load varies. More precisely the resistance force decreases when the load is reduced to change or partially change the angular displacement between the shaft of the obturator and the engine shaft. This changes the interval of time during which the exhaust and admission are simultaneously open resulting in a reduction in the amount of exhaust gas entering admission, admission being at greatly reduced pressure as compared to the pressure of the exhaust.

For example, in FIG. 9, a manometric apparatus 18 is shown including a diaphragm 19 subjected to the low pressure downstream of the gas valve through conduit 20. This low pressure exercises a force on spring 13b or directly on discharge piston 13a. Diaphragm 19 can also move a variable section needle sliding in a jet located at 14 at the delivery of the pump to vary the resistance of the delivery circuit of the pump and consequently its resistance force.

It should be noted that the angular displacement of the obturator as a function of speed can also be obtained utilizing in the same process a low pressure which is a function of speed as for example the low pressure found in the venturi or in one of the venturi of a carburetor or the pressure provided at the delivery of a water pump.

FIG. 7 shows at C4 and C5 the variation curves as a function of speed N, respectively, of charge R and of specific consumption $C_s$ of a rotary piston type engine in which the feed system includes a very long duct. The "tuning" between the vibration of the gaseous column and the admission cycle occurring for speed $N_1$ has already been explained. Curves $C'4$ and $C'5$ show the improvements of charge R and of specific consumption $C_s$ respectively obtained by the use of an obturator in accordance with the present invention to provide a variable complementary control of the feed at speeds lower than $N_1$.

FIG. 8 shows schematically for illustration only a rotary type motor to which is applied an embodiment of the present invention. This motor has three combustion chambers 15, 16 and 17.

The term "upper dead center" (PMH) and "lower dead center" (PMB) can be used for such a rotary motor by analogy to reciprocating piston motors corresponding, respectively, to minimum and maximum values of volume of each combustion chamber.

Thus, the position of the rotary piston in FIG. 8 corresponds to upper dead center in chamber 16.

In the following, and in analogy to reciprocating piston engines, the term AOA will designate advance in opening of admission with respect to upper dead center; RFA will indicate the delay in closing of admission with regard to lower dead center; and RFE will designate the delay in closing of the exhaust with respect to upper dead center.

When the speed is reduced below $N_1$ and approaches $N_2$, the obturator is displaced advancing the opening and the closing of admission by the same interval in the cycle for a given combustion chamber. The RFA for a given combustion chamber of the motor, for example, chamber 16, varies substantially in the same sense as the speed.

Further, delay in closing of the exhaust (RFE) remains unchanged since, in accordance with the present invention, only the admission is controlled. The coincidence of admission and exhaust for a given combustion chamber, chamber 16, for example, which is the angle during which admission and exhaust are partially or totally simultaneously open, increases when the speed is reduced and has a large value adjacent speed $N_2$ with corresponding increase in time of passage between exhaust and admission.

This critical coincidence makes it possible to provide at a low speed such as $N_3$ which may be the same as or adjacent to $N_2$, a scavenging of the dead volume of the chambers when they occupy a position adjacent that of chamber 16 of FIG. 8. This scavenging of the chamber can be utilized at speed $N_3$ to improve the characteristics of the motor in accordance with curves $C''4$ and $C''5$ of FIG. 7. The scavenging of the chamber is favored by a high pressure at the level of port 1a resulting from oscillations of the feed air occurring in the admission duct.

It should be understood that the present invention is not limited to the described embodiments but includes variations thereof which may occur to those skilled in the art.

Thus the obturator can be replaced by any suitable rotating member, a conical or cylindrical plug always including a flexible or articulated arm so as to function as a valve. This arm can be of variable size and the cylindrical plug may have an axial displacement as a function of the speed or of the load in addition to rotary displacement.

The admission duct in which the obturator is mounted can be a lateral duct located on one of the sides of the block.

The obturator can include several obturation arms or several obturation members. The sealing arm can have a variable size and may include one or more openings which openings may be of annular shape.

The speed of rotation of the rotating member can be selected at will in relation to the motor speed.

Safety systems such as stops can be provided to substitute for spring 8 in case spring 8 breaks.

The angular displacement of the obturator can be provided for a particular range of speed of the engine for example from $N_2$ to $N_1$.

To this end, gear 7c which is mounted for free rotation on shaft 6a, as seen in FIG. 10, may be limited in its angular displacement with respect to shaft 6a by two stops $b_2$ and $b_1$ fixed on shaft 6a of pump 6.

Spring 8 exerts a predetermined force C2 applied to a pin 21 secured to gear 7c against stop $b_2$. It follows that the angular displacement only begins on increase of speed at a speed $N_2$ when the resistance force of the oil pump is equal to the predetermined force C2. Displacement terminates when gear 7c comes in contact with stop $b_1$.

Rotary or translational displacement can be provided by any other system as by utilizing an obturator having a portion subjected to centrifugal force or an obturator controlled by a displacement mechanism, translational or rotational, having a mass subjected to centrifugal force acting against a spring.

The supply circuit for the pump can be connected to more than one discharge piston to modulate the pump curve as desired.

The speed $N_2$ at which regulation begins can be a high speed corresponding to a relatively short admission duct.

Reference should therefore be had to the appended claims to determine the scope of this invention.

What I claim is:

1. Process for the control of feed to a rotary piston type engine having an admission circuit with characteristics providing an optimum level of feed for a predetermined speed of the engine utilizing the dynamic effects of the feed gas in vibrating state, the process providing an elevated level of feed at speeds lower than the predetermined speed for which the feed is optimum and including the steps of advancing by a given interval the closing and opening of admission in the cycle when the engine speed is less than the speed of optimum feed, and increasing this interval as the engine speed decreases.

2. A process as described in claim 1 including the step of decreasing the advance in the opening of admission for partial feeds at speeds lower than the speed for which the feed is optimum to reduce the interval of time during which exhaust and admission are simultaneously open.

3. Apparatus for control of feed of a rotary piston type engine, with an admission circuit providing an optimum level of feed for a predetermined engine speed utilizing the dynamic effects of the feed gas in vibrating state and providing an elevated level of feed for speeds lower than the speed of optimum feed, and an air admission port for the engine connected to said circuit, comprising a rotating obturator opening and closing said admission port, a shaft for said obturator, means for coupling said shaft to the drive shaft of the engine, said means including adjustment means providing a displacement in the angular position of said shaft of said obturator with respect to the drive shaft of the engine, said displacement being maximum at the speed of optimum feed and decreasing when the speed decreases from the speed of maximum feed.

4. Apparatus as described in claim 3, said adjustment means including a transmission shaft, apparatus exerting a resistance force on said transmission shaft as a function of the speed of the engine, coupling means connecting said transmission shaft to said motor shaft and to said rotary obturator, respectively, said coupling means including an elastic transmission system.

5. Apparatus as described in claim 4 including means for exerting on said transmission shaft a corrective force in function of the charge.

6. Apparatus as described in claim 4, said elastic transmission system including a gear mounted for free rotation on said transmission shaft and a torsion spring fixed at one of its extremities to said gear and fixed at its other extremity to said transmission shaft.

7. Apparatus as described in claim 4, said elastic transmission system comprising a gear mounted for free rotation on said transmission shaft and a torsion bar having one of its ends fixed to said gear and having its other end fixed to said transmission shaft.

8. Apparatus as described in claim 4, said means for exerting on said transmission shaft a resistance force including a pump and a shaft for said pump connected to said transmission shaft.

9. Apparatus as described in claim 8 including a calibrated jet located in the discharge circuit of said pump.

10. Apparatus as described in claim 8 including a discharge system for said pump, said discharge system including a cylinder, a piston sliding in said cylinder, a discharge port in the wall of said cylinder controlled by said piston and a spring controlling said piston.

11. Apparatus as described in claim 8 including means for varying a loss of charge in the discharge circuit of said pump as a function of the load on the engine.

12. Apparatus as described in claim 6 including two spaced stops on said transmission shaft limiting the free rotation of said gear on said shaft.

References Cited

FOREIGN PATENTS 905,226  4/1945  France.

RALPH D. BLAKESLEE, *Primary Examiner.*